United States Patent Office 3,435,207
Patented Mar. 25, 1969

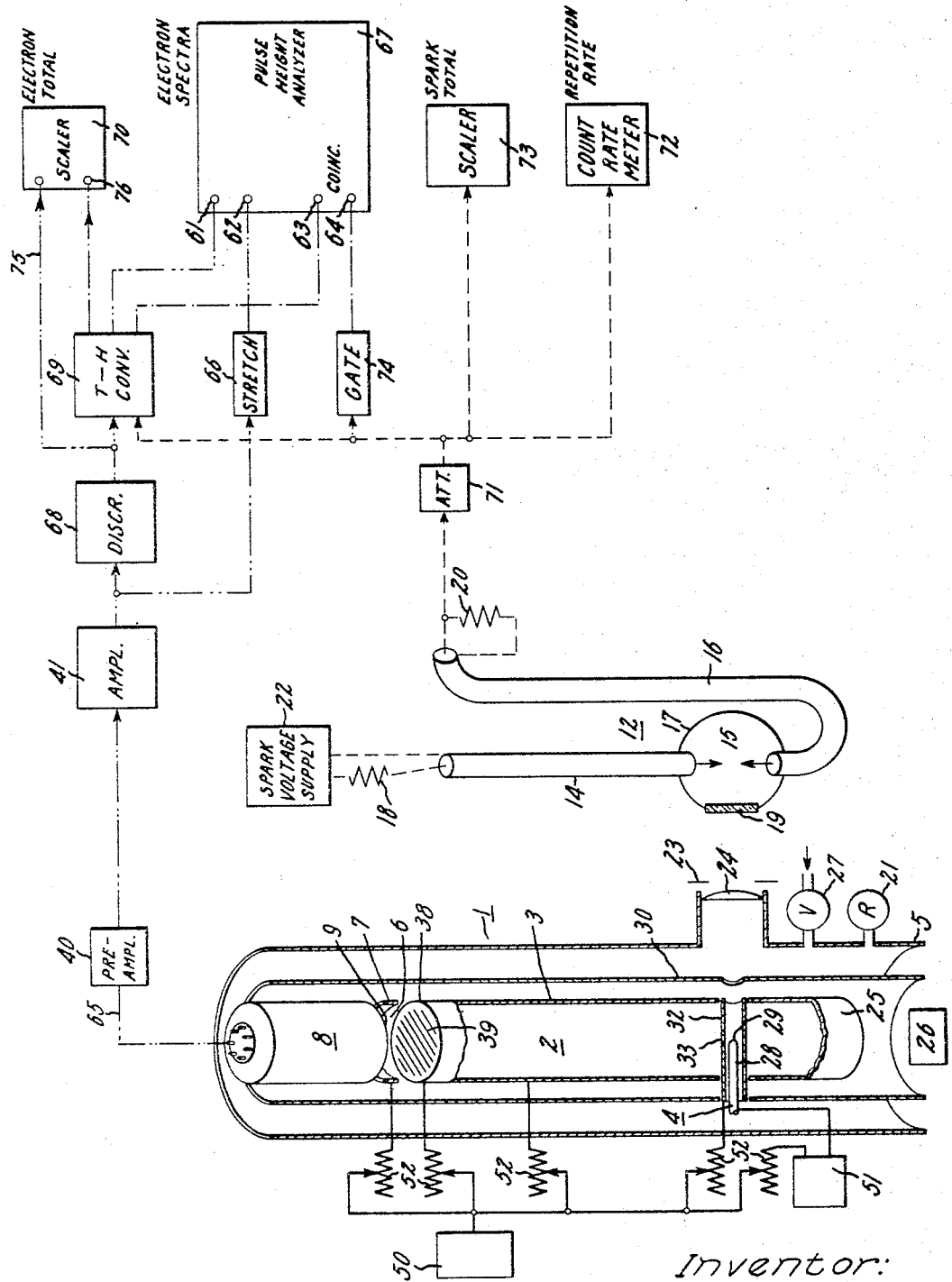

3,435,207
APPARATUS FOR MEASURING VELOCITY OF LOW ENERGY ELECTRONS
George C. Baldwin, Schenectady, N.Y., assignor to General Electric Company, a corporation of New York
Filed Jan. 6, 1966, Ser. No. 519,024
Int. Cl. B01d 59/44
U.S. Cl. 250—41.9     12 Claims

ABSTRACT OF THE DISCLOSURE

Apparatus and method for measuring velocity of electrons in the low energy range down to a few millivolts comprising an electron spectrometer having a photoemitter and detector separated by a long, shielded, field-free drift tube. Electrons from the photoemitter are caused to enter the drift tube singularly and then pass therethrough. The time-of-flight of the singular electron through the drift tube is determined and recorded to provide measurement of the electron velocity.

My invention relates to the measurement of electron velocities, and more particularly to a method and device for determining the velocity and velocity selection of low energy electrons and for measuring their interaction with gas molecules.

Quantitative understanding of many phenomena in plasma physics and gaseous electronics requires detailed knowledge of the properties of low energy electrons; in particular, of their distribution according to velocity and of their probability (cross-section) of collision with other particles, especially the collisions of slowly moving, low energy electrons with neutral atoms or molecules. The collision probability is of primary interest in many fields of physics and electronics, for example, the attenuation and reflection of microwave radiation by a plasma depends on the frequency of collision between low energy electrons and other atomic particles. Also, the efficiency of a magneto hydrodynamic generator is a function of the D.C. electrical conductivity of the plasma, which conductivity is dependent on the effective frequency of electron-molecule collisions. The collision frequency is the ratio of an average velocity of the particle to its average distance between collisions. Thus, it is seen that measurement of the velocities of slow electrons and the determination of the collision probability of electrons with other atomic particles is extremely useful in many fields of modern science.

Heretofore, there has been no accurate way of measuring the velocity of electrons having kinetic energies below one electron volt, and thus no reliable data exists on the collision probability of electrons for energies appreciably below this one volt level. Theoretical methods have been proposed for extrapolation of high energy data to these low energies, but assumptions must then be made which have not been verified experimentally. Thus, the absence of reliable information regarding the probability of collision of low energy electrons attests to the extreme difficulty of conventional techniques for measuring the velocity of electrons in the low energy region. One of the main problems with present methods is that available electron sources generate a broad range of electron velocities, and at low energies there has heretofore been no way of separating out those electrons travelling at particular, well-defined velocities that are of interest. A magnetic deflection technique that has often been employed is one in which a photoelectric or thermionic source is positioned on the circumference of a circular path defined by a series of slits. A magnetic field applied normal to the plane of the circular path selects electrons in a narrow range of velocities which are transmitted through the slits to a collector and read with an electrometer. A gas sample introduced into the path attenuates the electrometer reading to an extent dependent on the collision probability. Contact potential fluctuations from one slit to the next so greatly influence low energy electrons as they pass in proximity to the slits that this method has not been successful in measuring the velocity of low energy electrons, especially those below a one volt energy level. The need thus arises for a method and device for accurately measuring or selecting the velocity with which the collision probability of electrons of low energy can be measured, especially those electrons having an energy of one volt or less. My invention comprises a method and apparatus for measuring the velocity of low energy electrons by employing the time-of-flight principle; a principle which is based on determination of the time taken by an electron to travel a measured distance. The time-of-flight principle does not require that an electron pass close to slits or material structures, which in the prior art so greatly influences the flight of low energy electrons as to scatter them and prevent their measurement.

The principal object of my invention is the provision of an improved method and apparatus for reliably measuring the velocity of slowly moving electrons.

Another object of my invention is to provide such a method and apparatus which has substantially no effect on the velocity of these electrons as the measurements are being taken.

Another object of my invention is to provide such a method and apparatus by which the probability that an electron will collide with another atomic particle can be measured.

Another object of my invention is to provide a method and apparatus for measuring the probability of collision of very slow moving electrons in various gases.

Another object of my invention is to provide such a method and apparatus which measures the velocities of electrons over a wide range of energies simultaneously.

A further object of my invention is to provide such a method and apparatus which employs the time-of-flight principle for measuring electron velocity.

In carrying out the objects of my invention, I provide a highly precise electron-velocity measuring apparatus for electrons in the low energy range of several volts down to a few millivolts and a method for measurement of the velocity thereof. An electron spectrometer is provided which has a photoemitter and a detector separated by a long, well-shielded substantially field-free drift tube of a specific predetermined length. A spark gap is positioned so that the photoemitter is illuminated periodically with brief flashes of ultraviolet light to cause emission of electrons therefrom at known brief intervals. An aperture in a baffle surrounding the emitter allows a small fraction of the emitted electrons to enter singularly into the drift tube so as to pass therethrough. The electrons on exiting from the drift tube pass through an electron transparent shield into a region having a high intensity field therein whereupon they are accelerated and focussed onto the detector, a secondary emission multiplier producing output pulses that actuate electronic circuitry for recording these events according to the times-of-flight (velocities) of the individual electrons as they pass singularly through the drift tube. The distribution in velocity (and energy) of slowly moving, low energy electrons is readily determined from the output of the electronic circuitry. The collision probability at each velocity (or energy) can be evaluated by introducing a gas of known concentration into the drift tube and noting the change in the electron velocity distribution.

The features of my invention which I desire to protect herein are pointed out with particularity in the appended claims. The invention itself, however, both as to its organization and method of operation, together with further objects ad advantages thereof, may best be understood by references to the following description taken in connection with the accompanying drawing.

The attached drawing illustrates a view of a preferred embodiment of my invention.

Referring now to the figure, the basic principle of my invention relies on the time-of-flight of a free electron through a shielded drift space 2, within a drift tube (passageway) 3. In the time-of-flight technique an electron source, emitter 4, is spaced from a detector 8 by a known distance, the length of drift space 2. Emitter 4 emits electrons in brief bursts upon receipt of a periodically repeated trigger signal. The electrons then travel singularly through drift tube 3 and are focussed on detector 8 which is of a type that counts (detects) single electrons. Counts are registered only during one or more short time intervals, each of a specific time duration. Electrons which traverse the length of the drift tube in that time interval are registered, while others having velocities outside this range are not so recorded.

In the drawing there is shown, in partly schematic form, a preferred form of spectrometer apparatus embodying the electron velocity measuring apparatus of my invention which basically comprises an electron source, drift and detector assembly 1 and associated electrical circuitry. The spectrometer portion enclosed within vacuum envelope 5 includes the electron emitter 4, drift tube 3, and detector 8. A pulsed light source 12 causes emitter 4 to discharge electrons at specific time intervals. The pulsed light source 12 typically comprises two conductors 14 and 16 which are constructed of an electrically conductive material such as electrical transmission line or coaxial cable. Conductor 14 is initially charged slowly through a series resistor 18 by a suitable controllably adjustable source of voltage 22. Conductor 16 contains a parallel connected resistor 20 at one end thereof which is preferably matched to the characteristic line impedance and is connected to pulse counting circuitry as will be subsequently explained. The potential difference caused by the voltage difference at the terminal ends of conductors 14, 16 is impressed across gap 15 and, when of sufficient magnitude, causes a spark between the adjacent terminal ends of conductors 14 and 16. When the spark occurs, a voltage step, of magnitude somewhat less than half of the breakdown voltage, is transmitted through each of conductors 14 and 16. Thus, a negative voltage step is transmitted through conductor 14, reflected from its other end which is of such high impedance as to be essentially an open circuit, and returned thereafter to the spark gap terminal end of conductor 14, to reduce the potential thereof to zero. A positive voltage step is transmitted through conductor 16 and is absorbed in its termination, resistor 20. Thus, as a result of this combined action the spark discharge is rapidly terminated.

The connection between conductor 16 and the electronic circuitry in schematic form, as shown in the illustration, provides the circuitry with a (zero-time) signal at an exactly known brief interval of time after the spark discharge occurs across gap 15. This insures that the pulse counting circuit is synchonized with the spark and therefore with the instant of electron emission from emitter 4. Spark gap 15 is itself preferably constructed of suitable refractory discharge elements to insure reliability and accuracy of discharge, and is surrounded by a thick walled opaque chamber 17 which is constructed of a material such as brass and shaped in cylindrical, spherical or other suitable form. Window 19 in chamber 17 is preferably constructed of fused quartz to permit ultraviolet light caused by the spark discharge to be transmitted out from within chamber 17 and be thereafter focussed onto emitter 4. Normal operation of spark gap 15 may require a gas pressure within chamber 17 which is preferably somewhat in excess of one atmosphere though, alternatively, this can be lowered or raised as desired. Greater emission of light is produced at higher pressures, but prolongation of the spark discharge may then reduce the precision of operation of the spectrometer. Chamber 17 is preferably first evacuated and then filled with a gas such as hydrogen which has been found in practice to produce more nearly constant light pulses of shorter, more precise duration. Repetition rate of sparking can be varied by adjustment of voltage supply 22 within wide limits, with $10^3$ sparks per second being a typical rate.

Adjustment of the spark discharge elements 15, window 19 and chamber 17, may be provided to position the spark so that the most concentrated ultraviolet illumination is imaged by a converging lens 24 on the end 29 of emitter 4. Converging lens 24 is interposed between emitter 4 and window 19 and is constructed of a suitable material such as fused quartz and shaped so that the light rays coming through the window are focussed with proper intensity onto hemispherical emitter end 29 to produce an image in ultraviolet light of the spark discharge thereon. A camera type shutter and iris diaphragm 23 may be provided to adjust the light transmitted through lens 24 to control the amount of light that strikes emitter 4.

Emitting element 4 is constructed of a material such as gold-plated molybdenum, enclosed on end 29, and has a heating element 28 positioned within. Gold is chosen because of its chemical stability, work function near that of colloidal graphite, and high quantum yield of photoemission. Emitter 4 upon being illuminated by a spark discharge at gap 15 emits electrons therefrom by the photoelectric effect which inherently generates a continuous distribution of electron energies ranging from zero to a maximum value which depends upon the wavelength of the light from the spark. It will be understood that there are many other ways of effecting a pulsed periodic emission of slow electrons that will be suitable for my spectrometer. Two such examples are (1) the generation of secondary electrons by a fast, gated primary electron beam and (2) maintaining the grid of a thermionic tube at cut-off until the time desired to produce electrons.

Surrounding emitter 4 is a tubular baffle means 32 which is coaxially positioned with respect thereto and contains an opening 33 located adjacent hemispherical end 29 of emitter 4, to permit only electrons which are travelling in the proper direction, that is toward detector 8, to enter drift tube 3, and thus prevents electrons emitted in other directions from entering the drift tube. The electrons that enter drift tube 3 are a small fraction of all electrons emitted, which by way of example is often only one electron of $10^5$ electrons emitted, so that 100 or more spark flashes must often occur before an electron will enter drift tube 3. Electrons that do not enter opening 33 are collected on baffle 32, and may be monitored by an electrometer or other suitable measuring device 51, as will hereinafter be described. Baffle 32 is long and cylindrical in form so as not only to act to baffle, as aforementioned but also to effectively isolate emitter 4 from extraneous electrical fields emanating from without the drift tube and at the same time effectively allow entry of light onto emitter 4. By way of example, baffle 32 may be fabricated of a material such as titanium and coated uniformly with colloidal graphite to insure a constant contact potential on all parts of its surface. Colloidal graphite is preferably utilized as a coating for all electrodes exposed to the drifting electrons, with the exception of photoemitter 4, to obtain uniformity and constancy of work function. It is important to choose the proper materials from which to fabricate the electron source, drift and detector assembly 1 in order to also obtain chemical stability (of the inner surfaces thereof) and low background electron emission.

Drift tube 3, surrounding drift space 2, through which the electrons being measured travel, may be open cage comprising three or more concentric cylinders of grid-like screen material. The cylinders are closely spaced so that, as illustrated in the drawing, they appear as one integral unit 3. The two inner cylinders are enclosed in a cylinder of coarser mesh, typically a coaxial helical grid; all three elements are constructed of a metallic screening material such as molybdenum, assembled by spot welding and coated with colloidal graphite, as explained heretofore. The outer cylinder serves to reduce electric fields as well as to stiffen the structure.

Alternatively, a plurality of long, thin planar strips arranged in a radial array and extending parallel to and coaxial with the electron drift path are employed as the drift tube, in place of the concentric cylinders and helical grid previously discussed. The openings between the grid wires or strips are narrow to prevent field penetration but sufficient in number to allow electrons to escape that are not travelling in paths properly directed through drift space 2. As will be subsequently explained, a small retarding voltage is preferably applied between drift tube 3 and a surrounding magnetic shield 30 to prevent electrons from extraneous sources from entering into drift tube 3.

A suitable system for providing vacuum conditions within drift tube 3, when desired, comprises a pumping means 26 such as the combination of an ionic pump and an absorption type rough pump, mounted beyond the end 25 of a drift tube 3 proximate to emitter 4. Pumps 26 are connected to vacuum envelope 5 by suitable leakproof fittings such as flanges, welds and gaskets. It will be appreciated that this pumping arrangement is only one of many means that may be employed to achieve the desired conditions within vacuum envelope 5 and drift tube 3 which conditions may include the maintenance of low partial pressure of any gases or vapors other than those being investigated for keeping surfaces of the apparatus chemically clean. When using my apparatus to determine the cross-section for electron-atom or electron-molecule collisions, a selected gas is introduced within envelope 5 (and thus into drift tube 3) at a controlled rate by means of valve 27. The pressure of this gas (i.e., the molecular concentration) is measured by a suitable absolute pressure manometer 21 such as a McLeod gauge since knowledge of the molecular concentration in the drift region is necessary.

Positioned at the opposite end of drift space 2 from emitter 4 and baffle 32 is grid 38. A preferred form of grid 38 is a slat arrangement as described in concurrently filed, copending application S.N. 519,158 entitled "Electron Transparent Shield for Separating Regions of Different Field Intensities" by the same inventor, George C. Baldwin, and assigned to the assignee of the present invention. The latter application also describes the alternative form of drift tube 3. The slat grid 38, as illustrated in the drawings therein, comprises an array of planar rectangular strips 39 which are substantially longer than they are wide and are placed between two annular conducting plates and aligned so that the slats are in planes parallel to the direction of travel of the electrons through the drift tube. The slats 39 are secured to the plates in the grid arrangement by a suitable fastening method, as by brazing with gold, and are preferably coated with colloidal graphite for maintaining the desired uniform electrical contact potentials. Grid element 38 with slats 39 parallel to the drift tube axis, is positioned between drift space 2 and acceleration space 6. A focussing means 7 comprising a hollow cylindrical member coaxially surrounding space 6, is located between detector 8 and grid 38, coaxial with drift tube 3, and is adapted to have a potential applied thereto. During operation, voltages are applied to detector 8 and focussing means 7 to form lines of electric force throughout space 6 and within the narrow spaces between slats 39 of grid 38. The electric field thus produced within space 6 increases the energy of the electrons coming from the field-free drift tube so that their energy is sufficient for them to be recorded by detector 8.

It also has a focussing effect, i.e., electrons coming from the field-free drift tube are directed onto the bottom sensitive plate of detector 8 by the combination of the lines of force between the slats of grid 38 and the lines of force within space 6, which are all directed toward detector 8. Electrons that emerge from the drift tube are aligned by these lines of force so that all electrons emerging from drift tube 3 properly impinge on detector 8 so that they are all counted (i.e., detected). The focussing effect within the slats of grid 38 is such that electrons entering the grid at points not on the midplanes between the grid slats are oscillated transversely with diminishing amplitudes until they are properly directed to impinge on detector 8. It will be appreciated that by employing the slat grid arrangement, the high potential field existing on the side proximate to detector 8 is effectively prevented from interfering with the field-free region being maintained within the drift tube 3, while permitting electrons coming from the drift tube to readily pass through the grid 38.

Detector 8 preferably comprises a conventional electron emission particle multiplier consisting of several dynodes composed of an appropriate material such as oxidized silver-magnesium or beryllium-copper, in a spaced parallel array, typically a "venetian blind" pattern. Detector 8 is aligned with the drift tube 3 and positioned on the other side of the grid 38 therefrom, so that electrons must travel through grid 38 from drift space 2 to reach and be counted (sensed) by detector 8. The detector operates in the conventional manner to count individual electrons that come into contact therewith, that is, by multiplying them by secondary emission at each dynode surface. By way of example, the gain of such a typical electron multiplier is about 2.5 at each dynode, and $(2.5)^{15}$ or about $10^6$ after 15 stages. Preferably, the central area of the lower face 9 of the detector is the sensitive area where electron impact is desired. An alternative detector comprises a monolayer of activated zinc oxide phosphor on one surface of a sheet of glass which emits light flashes or "scintillations" when electrons impact the coated surface. Means are also provided for incorporating a photomultiplier in combination with the alternative detector for counting the scintillations caused by electron impact. The photomultiplier may be refrigerated to reduce noise, if desired.

It will be appreciated that while I have described several modes of electron counting means there are numerous other types that will serve equally as well. To prevent ambient magnetic fields from interfering with the measurement process taking place and especially from distorting the flight paths of electrons travelling through the drift space 2, magnetic shielding 30, as previously mentioned, is provided. Shield 30 comprises an inner tubular member and an outer concentric tubular member which are both coaxial with drift tube 3 and are constructed of an annealed high permeability alloy for maximum effectiveness. The magnetic shield prevents static magnetic and electromagnetic fields from entering drift tube 3 and destroying the field-free environment maintained therein. A system of degaussing coils or solenoids may be mounted coaxially with the drift tube adjacent detector 8 to compensate for most of the ambient fields; in particular, coils near the detector will increase the effectiveness of the shielding of detector 8 and of drift tube 3. Additional magnetic shielding may also be provided outside the vacuum enclosure in the form of cylinders, enclosing the electron multiplier structure.

Biasing potentials are applied to terminals on grid 38, focussing means 7, drift tube 3, baffle 32 and emitter 4 from a suitable voltage source 50, such as a 12-volt storage battery, through appropriate wiring or other electrical connections. Potentiometers 52 are preferably inserted between the terminals and voltage source 50 for adjusting the individual potentials applied to the various elements. These voltages maintain the bias potentials of the grid, baffle and drift tube commensurate with that of the emitter to insure that a constant (nonzero) or zero electric field is maintained through the flight of an electron. Any potential other than that for zero field would change the transit time (velocity) of the electron in its flight through the drift space 2 (which may be desirable when utilizing the spectrometer as an electron-velocity selector, as hereinafter described). The potentiometers may be separate or combined in one unit for ease of operation. Also, the grid, baffle, drift tube and focussing means are preferably coated with colloidal graphite to further aid in maintaining the respective potentials commensurate with the emitter potential for proper operation of the spectrometer. An electrometer of conventional design or other measuring device 51 capable of accuracy in the order of 2% at $10^{-13}$ amperes may be inserted between the emitter 4 or baffle 32 and its respective potentiometer 52 for monitoring the total electron current emitted by emitter 4 and substantially all collected by baffle 32. Drift tube 3 (providing a 0.475 meter drift path in one specific embodiment hereinafter described) is normally maintained at a preset fixed potential, for example —5 volts, and the remaining potentials are adjusted to either compensate for, or to impart a known energy increment to the electrons, as will be further explained.

Basically the operation of the spectrometer is as follows. Voltage supply 22 causes a spark across gap 15 between conductors 14 and 16. Ultraviolet light from the spark discharge passes through window 19 in chamber 17, and is focussed by lens 24 on the hemispherical tip 29 of emitter 4 to cause the discharge of electrons therefrom. Occasionally, one of these electrons passes through opening 33 in baffle 32 and travels through drift space 2 wherein a field-free environment (no electric or magnetic field) is maintained. Upon emerging from drift tube 3, the electron is accelerated and focussed by the electric field provided in acceleration space 6 by grid 38, detector 8 and focussing means 7 so that it impinges upon detector 8 with sufficient energy to be recorded. By the use of associated electronic circuitry that will hereinafter be described, the exact time (of flight) between spark discharge and recording of an electron by detector 8 is determined. The velocity of all electrons passing through the drift tube, the low energy electrons as well as the high energy ones, is then readily determined from this time-of-flight and thus the velocity of the low energy ones, those that were previously unmeasurable, is readily determined.

Following is a brief description of the electronic circuitry for recording and determining the time-of-flight of electrons through drift tube 3.

The electronic circuitry has as its primary function the recording of the distribution of electrons according to their times-of-flight through the drift space or, in other words, of recording each electron that passes through the drift space according to its velocity, thereby indicating the numbers of electrons in each of several velocity ranges that have passed through the drift tube during the period of measurement.

As shown by double-dashed line 65, which is illustrative of a suitable electrical connection such as shielded wiring (the short double-dashed lines representing the electron-count signal path in the electronic circuit), electron-count signals from the electron multiplier portion of detector 8 are amplified in a preamplifier 40 and amplifier 41 and then shaped by means of a suitable pulse-stretching circuit 66 to provide an input to a first group of recording channels 62 of a pulse height analyzer or other suitable analyzing and counting means 67. The pulse height analyzer sorts out pulses according to voltage amplitude and indicates the number of voltage pulses of each particular amplitude group that are supplied thereto. Suitable display means such as a series of lights, a punched tape, typed output system or curve plotter may also be provided to indicate the number of pulses recorded in each amplitude group.

Electron-count signals emanating from the electron multiplier of detector 8, preamplifier 40, and amplifier 41 also pass through a voltage amplitude discriminator 68 which passes only signals having amplitudes above a threshold or mean noise level. Each count signal passed by discriminator 68 supplies such count signal (stop pulse) to a "stop" input of a circuit 69, termed a time-to-pulse-height (T-H) converter. Converter 69 generates an output pulse of amplitude proportional to the time interval between receipt of a zero-time signal (illustrated by long-dashed line) derived from the spark-gap light source and essentially coincident therewith, and a stop pulse from the aforementioned output of discriminator 68. Thus, the output of circuit 69 can be related by calibration to the time taken for a photoelectron to traverse drift space 2. The output pulse signal of circuit 69 provides an input to a second group of recording channels 61 of pulse height analyzer 67 at "readout" time, a delay of 100 microseconds after receipt of the zero-time signal (in one specific embodiment of my invention) to ensure that analyzer 67 completes the amplitude registration before registering the time spectrum. If no stop pulse is received within 6 microseconds after a zero-time signal, converter 69 is automatically reset. Gating signals (illustrated by short single-dashed line) are applied to coincidence inputs 63, 64 of analyzer 67 in order to restrict its registration period to immediately after each spark for detector pulse height analysis, and to a corresponding but delayed interval for time analysis. Thus, a gating signal initiated by the zero-time signal, and generated within gating circuit 74, is applied to coincident input 64 of analyzer 67 in order to restrict its registration period to immediately after (i.e. within six microseconds) the spark discharge across gap 15 to control channel group 62 of analyzer 67 for recording the pulse height analysis. Time analysis is recorded by channel group 61 and is gated on by a signal generated within converter 69 and applied to coincident input 63 of the analyzer.

The output of discriminator 68 (when inputs thereto are above the discrimination level) is recorded separately by scaler measuring device 70 which is connected to discriminator 68 by suitable wiring 75. Another input terminal 76 of scaler device 70 is connected to an output of T-H converter circuit 69 to ensure operation of scaler 70 only during the time intervals starting with the zero-time spark signal and ending after time sufficient for the slowest electron of interest to travel through the drift tube. Thus, scaler 70 is employed to record all electrons detected irrespective of their individual times of flight.

A more detailed description of the components in the electron count signal path of the electronic circuit hereinabove described now follows. Preamplifier 40 employs special high-gain transistors having a noise level well below the discriminator threshold level so that they do not introduce extraneous signals which interfere with electron detection. The preamplifier preferably includes a charge sensitive feedback circuit having a small effective input capacitance, typically 3 nanofarads. Main amplifier 41 preferably uses fast switching transistors in feedback stages for gain stability and may also have gain control so that proper control of amplification is accomplished.

Discriminator 68 comprises a threshold circuit which amplifies and passes voltage pulses caused by electrons incident on the electron multiplier of detector 8 and which have magnitudes greater than ten times the mean noise level while preventing passage of (noise) voltage signals that are below the threshold level. These below-threshold level voltage signals that the discriminator 68 eliminates are primarily caused by electrical noise and other unwanted effects and are not related to the electrons being measured. In operation, the discriminator 68 is of a type which also differentiates the voltage pulse input thereto and thereby measures the characteristic slope of the voltage pulse signal and also determines the point at which the derivative of the input voltage reaches zero volts. These characteristics serve to cause the output voltage from the discriminator to be not only constant in magnitude and shape, but also uniform in time of passage regardless of the signal input level to the discriminator, for more accurate operation.

Time-height converter 69 preferably comprises a 0.01 microfarad (in the aforementioned embodiment) low leakage capacitor constructed of a material such as polystyrene, shunting one of a pair of transistors which is in series with a current-limiting resistor. In operation, when the shunting transistor is nonconducting (at zero-time), a linearly rising ramp voltage is generated across the capacitor. The second transistor is then also rendered nonconducting, terminating the ramp voltage (after 6 microseconds or by an earlier electron count from discriminator 68) and holding it constant until some fixed time interval (the aforementioned "readout" time which occurs 100 microseconds after zero-time), when the capacitor is rapidly discharged by the shunting transistor, thereby generating an output voltage pulse signal (the readout signal) of amplitude proportional to the time of duration of the ramp voltage (interval between zero-time and electron count). Three auxiliary circuit elements, a flip-flop and two univibrators, control the sequence of capacitor charge and discharge. Gating signals for the proper operation of scaler 70 (input 76) and of pulse height analyzer 67 (coincidence input 63) are derived from one of the univibrators of T-H converter 69.

The rise time of the amplified electron counts, at the output of amplifier 41, is in the order of 50 nanoseconds. This rise time is stretched electronically to 300 nanoseconds by means of pulse-stretching circuit 66 in order to match the input requirements of pulse height analyzer 67.

Pulse height analyzer 67 is preferably a commercial multichannel pulse height analyzer having an automatic routing feature that allows the pulse amplitude distribution and time spectrum of electron counts to be recorded in two separate groups of channels, each comprising 100 channels, and each associated with its appropriate time gate, inputs 63 and 64, respectively. Amplified counts from the electron multiplier are analyzed with respect to pulse amplitude by direct application of the stretched count pulse signals to analyzer 67. Thus, input 62 corresponds to 100 channels which record and sort the electrons as to pulse height or voltage amplitude of the pulses generated by detectors 8 to thereby indicate the sensitivity or gain of the electron detection and amplifying system and serve to monitor the detector so as to indicate whether it is functioning properly. As hereinabove-described, gating signals supplied to coincidence input terminals 63, 64, restrict the registration period of analyzer 67 to immediately after each spark for detector pulse height analysis, and to a corresponding but delayed interval for time-of-flight analysis. Thus, upon completion of the pulse height analysis (a process requiring approximately 88 microseconds), the analyzer 67 is available for analysis of the time-height converter 69 output, which appears 100 microseconds after zero-time. Input 61 corresponds to another group of 100 channels which record and sort the electrons according to their times-of-flight through the drift space 2. It will be appreciated that channels 61 and 62 may be embodied in separate units, if desired. By adjustment of appropriate controls of pulse height analyzer 67, such as a gain and base-line control, the calibration may be altered for convenience to provide ample resolution for study of the pulse amplitude distribution and time-of-flight spectra. Calibration equipment may consist of a pulse generator, digital time-delay circuit, and stepped attenuation network. Readouts by typewriter, curve plotter and/or punched tape may all be provided. Also, electronic data processing, associated with the punched tape, may be employed if desired.

The voltage pulses produced at spark gap terminating resistor 20 are attenuated by appropriate circuitry 71 to form the zero-time signals. The zero-time pulses initiate time-height conversion (input to T-H converter circuit 69), open registration gates (input to gating circuit 74), and also may be used to actuate a spark repetition rate meter 72, operate a scaler measuring device 73 for monitoring the consistency of operation of my apparatus, and trigger a monitoring oscilloscope (not shown). Spark count rate meter 72 is a conventional counter which indicates the number of spark counts over a specific time interval. Scaler 73 is a conventional scaler which records and displays the total number of sparks.

One of the most important uses for my time-of-flight electron velocity spectrometer hereinabove described is for the determination of the cross-section for electron-atom or electron-molecule collisions at very low electron energies (less than one electron volt). The collision cross-section requires the knowledge and selection of the electron velocity, and my apparatus is especially well adapted to measure and select the velocity of the very low energy electrons. Since only one electron traverses the field-free drift region 2 at a time, there are no space charge effects and negligible interaction between the measuring apparatus and drifting electron, and a highly accurate measurement and selection of the electron velocity is thereby obtained.

The electron collision cross-section for a selected gas at a particular gas pressure is determined by the following method. The apparatus must be initially calibrated as hereinabove mentioned to obtain a desired degree of resolution of the pulse height distribution and time spectrum of the electron counts. The calibration is performed in the following manner. The calibration equipment heretofore described (pulse generator, time-delay circuit, attenuation network) is connected into the electronic circuitry in the following manner: the output of the pulse generator is connected at the output of attenuator 71, and to the time-delay circuit which in turn has its output connected to the calibration equipment attenuation network. The output of this attenuation network is connected to the input of amplifier 41 whereby the calibration equipment effectively replaces the electron source, drift and detector assembly 1 of the spectrometer. The calibration proceeds as follows: the pulse generator is activated and the digital time-delay circuit is varied to obtain a calibration of the time scale such that the 100 time-analysis channel (input 61) correspond to a maximum of four or five microseconds. It can be appreciated that the time scale corresponds to the electron energy scale since for a known drift space length (of 0.475 meter in one embodiment), the time-of-flight for a 2.0 electron-volt electron in a drift-free environment is calculated to be 0.55 microsecond. In like manner, the times-of-flight for 1.0 and 0.10 electron-volt electrons is 0.75 and 2.5 microseconds, respectively. Thus, each of the 100 time-analysis channels is assigned a specific electron-volt energy level, the range of the 100 channels being determined by the energy range (spectrum) of interest, and being sufficiently small to obtain adequate resolution of the energy or time spectrum. A time channel width of 0.025 microsecond has been found to be satisfactory.

The pulse height scale is next calibrated by maintaining a constant time delay of the generated pulses (in the order of 2.0 microseconds has been found satisfactory), and the attenuation network is varied to vary the pulse amplitude over a given range, the range being primarily dependent on the gain of detector 8 and amplifiers 40, 41. The range of the 100 pulse-height distribution channels (input 62) may be in the order of 1.5 millivolts at the input to amplifier 41 and thus a pulse height channel width of 0.015 millivolt is satisfactory.

After the calibration is completed, the apparatus is ready for its intended use such as in the determination of the cross-section for electron-atom or electron-molecule collisions, especially at very low electron energies (less than one electron volt), although it may also be employed at higher energies when calibrated therefor. The calibration equipment is disconnected from the electronic circuitry of the spectrometer, and the spark voltage supply 22 is activated for a selected interval such as 1 to 10 hours to obtain a pulse height and energy (time) spectrum for the electrons which travel singularly through drift tube 3. The relatively long measurement time is necessary to insure adequate statistical accuracy, but this apparent disadvantage is offset by the greatly improved discrimination against background electron emission and the use of multichannel time-of-flight registration which makes a wide range of electron energies accessible to measurement and recording and provides for the concurrent display thereof. This step is then repeated after the selected gas, for which the electron collision cross-section is to be determined, is admitted and maintained at a particular constant pressure within envelope 5. The pulse height analyses are then compared to determine whether the detector 8 sensitivity has changed due to the gas; if it has changed, the detector sensitivity must be calculated to obtain the correct number of electron counts sensed by detector 8. The pulse height analysis thus determines any effect of the sample gas on the emission and detection processes. The electron counts of the 100 channel electron count-energy spectrum are then compared at each of the particular energy levels of interest to obtain a ratio of counts at each of such energy levels. The ratio of counts taken with a vacuum condition to counts with the selected gas determine the transmission of the gas (i.e. the attenuation of electrons due to the gas) for the various energy electrons, from which may be calculated the collision cross-section for each electron energy level. The collision cross-section for a selected gas at a particular pressure may then be plotted for the electron energy spectrum of interest.

The above procedure which evaluates the collision cross-section by changes in electron velocity distribution may then be repeated for the same gas at other pressures, or for other gases.

The significant feature of my spectrometer is its ability to measure the distribution of times-of-flight of low energy electrons. It is primarily intended to measure the transmission of various gases for electrons of various energies. The possible use of this or similar equipment for research on secondary electron emission and on the reflection of very slow electrons at surfaces also exists. Its use as an ultraviolet-sensitive photomultiplier of high resolution for study of fluorescence decay periods in gases excited by a spark discharge in chamber 17 is also suggested. Use of the spectrometer in conjunction with deliberate biasing procedures and various emitting materials for emitter 4 offers a new technique for study of photoelectric phenomena. Its use as a pressure manometer is also very important (knowledge of the collision cross-section, and the ability to accelerate electrons in the drift tube to a selected energy permits translation of the attenuation of the number of counts within the drift tube into a gas pressure measurement). Also, its adaptation as a source of single electrons of accurately defined energy (by adding a time-delayed gate feature at the grid end of the drift tube together with an accurately adjustable post-acceleration potential) is also possible. Finally, the spectrometer appears ideally suited for the study of effects of adsorbed surface films on field emission and contact electromotive force.

It is apparent from the foregoing that my invention attains the objectives set forth. In particular, I have provided an electron velocity selector apparatus which is well suited to the investigation of various phenomena employing low energy electrons, especially in the energy area previously unexplored, that is, below one electron volt. My time-of-flight technique avoids the problems in previously employed magnetic deflection techniques wherein accurately defined paths and deflecting fields for the electrons had to be established. In operation, my spectrometer has measured velocities of electrons at energies as low as 0.09 electron-volt to thereby determine the collision cross-section of these electrons in gases such as helium. The 0.09 electron-volt level is not to be construed to be a limitation of the minimum energy electrons which may be analyzed with my method and apparatus.

Having described my method and apparatus for measuring the velocity of low energy electrons, it is believed obvious that modifications and variations of the invention are possible in light of the above teachings. It is, therefore, to be understood that changes may be made in the particular embodiment of my invention described which are within the full intended scope of the invention as defined by the following claims.

What I claim as new and desire to secure by Letters Patent of the United States is:

1. Apparatus for measuring the velocity of low energy electrons especially in the energy range below one electron-volt comprising:
   means for emitting single electrons directed in a selected direction,
   a substantially magnetic and electric field-free passageway of predetermined length in communication with said electron emitting means for passage of the individual electrons singularly therethrough, and
   means in communication with said passageway for detecting each electron and timing its transit through said passageway whereby the velocity of electrons in the energy range below one electron-volt may be determined.

2. The apparatus set forth in claim 1 and further comprising:
   an electron transparent shield separating the electric field-free region of said passageway from a high intensity field region adjacent said detecting means whereby each electron after transit through said passageway is accelerated sufficiently to be recorded by said detecting means, and
   said shield aligned with said passageway and said detecting means, and positioned therebetween.

3. The apparatus set forth in claim 2 and further comprising:
   means for maintaining desired electric potentials of said passageway and said shield relative to said electron emitting means to insure the maintenance of a zero electric field through the flight of each electron between said emitting means and said shield for electron velocity measurements, and to insure the maintenance of a desired nonzero electric field therebetween when employing the apparatus as an electron-velocity selector.

4. The apparatus set forth in claim 2 and further comprising:
   means for introducing a selected gas at a predetermined pressure within said passageway whereby the cross-section for electron-molecule collisions for the selected gas may be determined from the attenuation of electrons detected by said detecting means in the presence of the gas.

5. The apparatus set forth in claim 1 and further comprising:
   electronic circuitry means connected to said detecting means for determining the time-of-flight of each electron through said passageway and determining the energy spectrum of the electrons therefrom.

6. The apparatus set forth in claim 5 and further comprising
   means for generating a zero-time signal at the initiation of the emission of each electron, said zero-time signal generating means electrically connected to said electronic circuitry means which operates for only a specific short time interval after each singular electron emission whereby the respective numbers of electrons having velocities only within selected ranges determined by the specific time interval are recorded.

7. The apparatus set forth in claim 6 wherein said electronic circuitry means includes a multi-channel analyzer which makes selected ranges of electron energies accessible to voltage amplitude and time interval measurement and recording to thereby determine by an amplitude and time spectrum registration the energy spectrum of only the singularly emitted electrons falling within the selected ranges, and provides for the concurrent display thereof.

8. The apparatus set forth in claim 7 wherein said electronic circuitry means further includes voltage amplitude discriminator means connected to an output of said detecting means for discriminating against noise level signals to thereby pass only electron count signals produced by said detecting means upon detection of the singularly emitted electrons.

9. The apparatus set forth in claim 8 wherein said electronic circuitry means further includes means connected between an output of said discriminator means and an input to a plurality of recording channels of said analyzer for converting each electron count signal passed by said discriminator means to an electrical pulse of amplitude proportional to the time interval between receipt of the zero-time signal and receipt of the corresponding electron count signal passed by said discriminator, said converting means provided with a second input connected to an output of said zero-time signal generating means for supplying the zero-time signal thereto.

10. The apparatus set forth in claim 9 wherein said multichannel analyzer comprises a first plurality of recording channels for recording the time spectrum comprising the numbers of electrons having times of flight corresponding to the selected ranges of electron energies, a first output of said converting means providing the amplitude-proportional-to-time pulses thereof to said recording channels, and a second output of said converting means connected to a second input of said analyzer for initiating operation of said first plurality of recording channels at a readout time following a selected delay subsequent to the zero-time signal.

11. The apparatus set forth in claim 10 wherein said multichannel analyzer further comprises a second plurality of recording channels for recording the amplitude spectrum of the electrons in the selected ranges of electron energies, said second plurality of recording channels connected to an output of said detecting means, and a fourth input of said analyzer connected to said zero-time signal generating means for initiating operation of said second plurality of recording channels at a readout time immediately following the zero-time signal and ending operation prior to the readout time for the recording of the time spectrum.

12. The apparatus set forth in claim 1 wherein said single electron emitting means comprises a photoelectric emitter for emitting electrons upon being illuminated, a pulsed light source for illuminating said emitter to cause discharge of electrons therefrom at specific time intervals, and a cylindrical baffle surrounding said emitter and having a single aperture therein aligned with said field-free passageway to permit only electrons which are discharged from the emitter in the direction toward said passageway to enter said passageway, the frequency of electrons entering the passageway being such that approximately 100 pulses of the light source occur before an electron enters said passageway.

References Cited

UNITED STATES PATENTS 3,191,028  6/1965  Crewe _____ 250—49.5
3,307,033  2/1967  Vestal _____ 250—41.9

OTHER REFERENCES

"Electron Velocity Micro-analyzer," by R. Shahbender, from RCA Technical Notes, RCA TN No. 310, November 1959, 3 pages.

WILLIAM F. LINDQUIST, *Primary Examiner.*

U.S. Cl. X.R.

250—49.5